United States Patent
Lykowski et al.

(10) Patent No.: US 8,365,710 B2
(45) Date of Patent: Feb. 5, 2013

(54) IGNITOR FOR AIR/FUEL MIXTURE AND ENGINE THEREWITH AND METHOD OF ASSEMBLY THEREOF INTO A CYLINDER HEAD

(75) Inventors: James Lykowski, Temperance, MI (US); Keith Hampton, Ann Arbor, MI (US); John Burrows, Northwich (GB)

(73) Assignee: Federal-Mogul Ignition Company, Southfield, MI (US)

( * ) Notice: Subject to any disclaimer, the term of this patent is extended or adjusted under 35 U.S.C. 154(b) by 579 days.

(21) Appl. No.: 12/573,380

(22) Filed: Oct. 5, 2009

(65) Prior Publication Data

US 2010/0083942 A1  Apr. 8, 2010

Related U.S. Application Data

(60) Provisional application No. 61/102,394, filed on Oct. 3, 2008, provisional application No. 61/185,040, filed on Jun. 8, 2009.

(51) Int. Cl.
*F02P 3/02* (2006.01)
(52) U.S. Cl. .................. 123/647; 123/169 PA
(58) Field of Classification Search .......... 313/141, 313/122, 130, 135, 136, 137, 143, 144, 145; 123/647, 635, 169 PA
See application file for complete search history.

(56) References Cited

U.S. PATENT DOCUMENTS

| | | |
|---|---|---|
| 1,379,060 A | 5/1921 | Sumner |
| 1,450,110 A | 3/1923 | Page |
| 1,965,534 A | 7/1934 | Nowosielski |
| 2,493,743 A | 1/1950 | Benson |
| 2,526,169 A | 10/1950 | Steeg |
| 2,609,808 A | 9/1952 | Bychinsky |
| 2,625,921 A | 1/1953 | Van Ry |
| 2,741,716 A | 4/1956 | Arthur et al. |
| 2,831,993 A | 4/1958 | Lentz |
| 2,840,742 A | 6/1958 | Watters |
| 2,850,000 A * | 9/1958 | Kauffmann et al. ...... 123/169 R |
| 2,874,321 A | 2/1959 | Summerer |
| 2,939,983 A | 6/1960 | Pierce et al. |
| 2,969,582 A | 1/1961 | Meredith et al. |

(Continued)

FOREIGN PATENT DOCUMENTS

| | | |
|---|---|---|
| EP | 0454598 | 10/1991 |
| JP | 06-050249 | 2/1994 |

(Continued)

OTHER PUBLICATIONS

Sato, Ignition and Its Manufacturing method, Apr. 20, 2006, JP 2006-108630, English Machine Translation.*

*Primary Examiner* — Stephen K Cronin
*Assistant Examiner* — Raza Najmuddin
(74) *Attorney, Agent, or Firm* — Robert L. Stearns; Dickinson Wright, PLLC

(57) ABSTRACT

An internal combustion engine and ignitor therefore is provided. The ignitor has an insulator extending between a nose end and a terminal end with an electrode extending outwardly from the nose end to ignite an air/fuel mixture with a cylinder chamber. A terminal extends from the terminal end and is configured in electrical communication with the electrode. A metal shell surrounds at least a portion of the insulator. The metal shell is free of external threads for attachment to a cylinder block. A connecting wire extends from the terminal for electrical communication with a power source. A tube has a lower end that receives the terminal end of the insulator therein. The tube extends about the connecting wire to an upper end opposite the lower end. The lower end of the tube compresses the shell into fixed relation within the opening of the cylinder head.

34 Claims, 7 Drawing Sheets

U.S. PATENT DOCUMENTS

| | | | |
|---|---|---|---|
| 3,750,392 A | 8/1973 | Zoll | |
| 4,264,844 A | 4/1981 | Axe et al. | |
| 4,374,338 A | 2/1983 | Shopsky | |
| 4,472,152 A | 9/1984 | Shopsky | |
| 4,715,337 A * | 12/1987 | Bohl et al. | 123/169 PA |
| 5,186,132 A * | 2/1993 | Runge | 123/169 R |
| 6,617,769 B2 * | 9/2003 | Suzuki | 313/141 |
| 6,655,334 B2 | 12/2003 | Inagaki et al. | |
| 6,655,367 B2 * | 12/2003 | Ohkama et al. | 123/634 |
| 6,703,770 B2 * | 3/2004 | Suzuki et al. | 313/141 |
| 6,883,507 B2 | 4/2005 | Freen | |
| 7,310,037 B2 * | 12/2007 | Skinner et al. | 336/90 |
| 7,681,562 B2 * | 3/2010 | Boerjes | 123/622 |
| 7,768,183 B2 * | 8/2010 | Callahan et al. | 313/137 |
| 2007/0039599 A1 * | 2/2007 | Skinner et al. | 123/647 |
| 2008/0054777 A1 * | 3/2008 | Callahan et al. | 313/143 |

FOREIGN PATENT DOCUMENTS

| | | | |
|---|---|---|---|
| JP | 10-252630 | * | 9/1998 |
| JP | 2003-083219 A | | 3/2003 |
| JP | 2006-108630 | * | 4/2006 |
| JP | 2006108630 | | 4/2006 |
| JP | 2008-202453 | * | 9/2008 |

* cited by examiner

IGNITOR FOR AIR/FUEL MIXTURE AND ENGINE THEREWITH AND METHOD OF ASSEMBLY THEREOF INTO A CYLINDER HEAD

CROSS-REFERENCE TO RELATED APPLICATION

This application claims the benefit of U.S. Provisional Application Ser. No. 61/102,394, filed Oct. 3, 2008, and U.S. Provisional Application Ser. No. 61/185,040, filed Jun. 8, 2009, both of which are incorporated herein by reference in their entirety.

BACKGROUND OF THE INVENTION

1. Technical Field

This invention relates generally to ignitors used for igniting air/fuel mixtures in automotive application and the like.

2. Related Art

U.S. Pat. No. 6,883,507 discloses an ignitor for use in a corona discharge air/fuel ignition system. The firing end of the igniter has an outer metal shell that surrounds the insulator and which is formed with external threads for screwing the ignitor into a threaded spark plug socket of a cylinder head of an internal combustion engine in the same manner as a conventional spark plug. These threads occupy space that could otherwise be occupied by other functional parts of the ignitor, such as the insulator, to enhance the performance of the ignitor and the engine. In addition, forming these threads requires additional steps in manufacture, which ultimately adds cost to manufacture the ignitor.

SUMMARY OF THE INVENTION

An internal combustion engine ignitor configured for attachment in an opening of a cylinder head is provided. The ignitor has an insulator extending between a nose end and a terminal end with an electrode received in the insulator. The electrode extends outwardly from the nose end to ignite an air/fuel mixture with a cylinder bore. A terminal is received in the insulator and extends outwardly from the terminal end. The terminal is configured in electrical communication with the electrode. A metal shell surrounds at least a portion of the insulator. The metal shell is free of external threads for attachment to the cylinder block. A connecting wire extends from the terminal away from the insulator for electrical communication with a power source. A tube has a lower end that receives the terminal end of the insulator therein. The tube extends about the connecting wire to an upper end opposite the lower end. The lower end of the tube is configured to compress the shell into fixed relation within the opening of the cylinder head.

Accordingly, an ignitor constructed in accordance with one aspect of the invention has a firing end free of external mounting threads, and thus, this allows the insulator to be increased in size and/or the opening in the cylinder head to be decreased in size.

In accordance with another aspect of the invention, a mounting flange is fixed to the upper end of the tube, wherein the mounting flange is configured for attachment to mounting surface of the cylinder head to simultaneously seat the ignitor in fixed relation against a shoulder within the opening of the cylinder head.

In accordance with another aspect of the invention, the connecting wire is configured in electrical communication with a circuit board which is mounted to the mounting flange.

In accordance with another aspect of the invention, a cover surrounds the circuit board and is attached to the mounting flange to provide a sealed environment about the circuit board.

In accordance with another aspect of the invention, the flange has a fill opening for the introduction of an inert pressurized fill gas into the sealed space of the ignitor.

In accordance with another aspect of the invention, an internal combustion engine is provided. The internal combustion includes a cylinder head with an ignitor opening extending from an upper surface to a combustion chamber and having a radially extending upper shoulder between the upper surface and the combustion chamber, and an ignitor. The ignitor includes an insulator extending between a nose end and a terminal end. An electrode is received in the insulator and extends outwardly from the nose end. A terminal is received in the insulator and extends outwardly from the terminal end. The terminal is configured in electrical communication with the electrode. A metal shell surrounds at least a portion of the insulator and is free of external threads for attachment in the ignitor opening. A tube having a lower end receives the terminal end of the insulator therein and extends to an upper end opposite the lower end. A mount flange is attached to the upper surface of the cylinder head and is attached to the upper end of the tube. The mount flange compresses the lower end of the tube into abutment with the shell and fixes the shell and the insulator within the ignitor opening of the cylinder head.

In accordance with another aspect of the invention, a method of attaching an ignitor within an ignitor opening in a cylinder head is provided. The method includes providing the ignitor with an insulator surrounded at least in part by a shell, and disposing the ignitor in the ignitor opening. Then, applying a purely axially compressive force directed along a central axis of the ignitor opening to the shell of the ignitor and fixing the ignitor within the ignitor opening under the compressive force.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PREFERRED EMBODIMENTS

Figure 1:
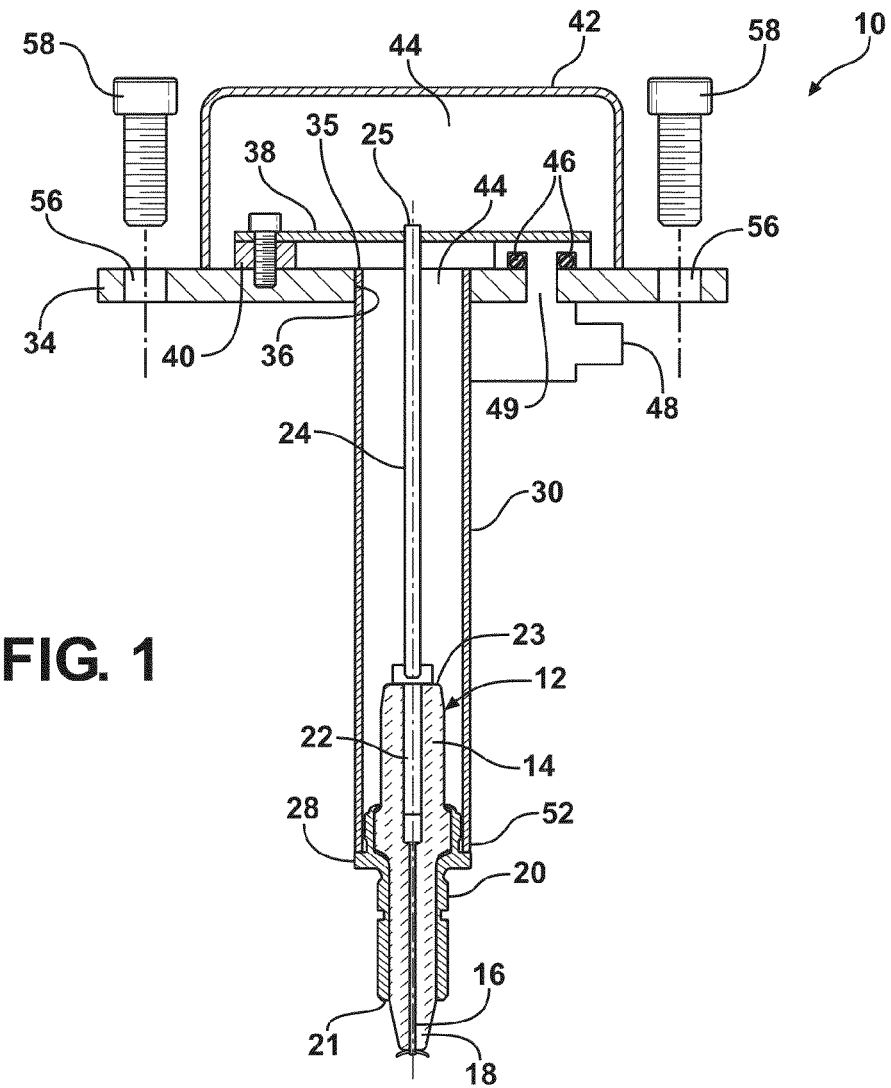
FIG. 1 is a cross-sectional view of an ignitor constructed in accordance with one aspect of the invention.
Figure 2:
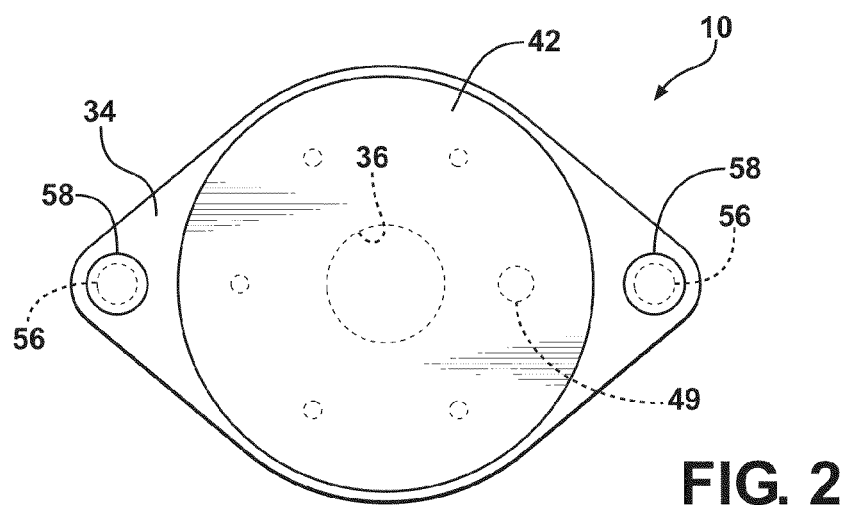
FIG. 2 is a view looking generally in the direction of arrow 2 of FIG. 1.

Referring in more detail to the drawings, FIG. 1 illustrates an ignitor 10 constructed in accordance with one aspect of the invention. The ignitor 10 includes a firing end assembly 12 having an insulator 14, an electrode wire, also referred to as electrode 16, received within and extending from a lower end, also referred to as nose end 18, of the insulator 14; a metal shell 20 receiving and surrounding a middle portion of the insulator 14 such that the nose end 18 of the insulator 14 projects out of a lower end 21 of the shell 20, and a terminal 22 received within and extending outwardly from an upper end 23 of the insulator 14. A connecting wire 24 has a lower end attached in electrical communication with the terminal 22 and extends from the terminal 22 to an upper end 25 configured for electrical communication with a power source (not shown). The shell 20 is fixed and retained in a cylinder head 26 of an internal combustion engine by application of an axial force on an external flange 28 of the shell 20, shown here as being applied via a metal tube 30 pressing on the radially outwardly extending flange 28. The metal tube 30 can be attached, such as via a weld joint, for example, to a mount flange 34 at one end 35 while an opposite end 36 bears on the shell flange 28 in compressed abutment therewith. The mount flange 34 has a planar or substantially planar mounting surface 31 configured for abutment with an upper surface 29 of the cylinder head 26. Accordingly, the ignitor 10 is fixed and maintained in the cylinder head 26 without threading the ignitor 10 into the cylinder head 26, and thus, manufacturing and functional benefits are realized. For example, this allows the insulator 14, including the nose end 18 extending into a combustion chamber 32 of an cylinder block 33 to be increased in size, or the opening in the cylinder head 26 to be decreased in size, or both.

The connecting wire 24 extends within the tube 30 upwardly from the terminal 22, through an opening 36 in the flange 34 and is connected in electrical communication to a circuit board 38 which is mounted by intervening insulating pads 40 on the flange 34. A metal cover 42 surrounds the circuit board 38 and is attached, such as by being welded, for example, to the flange 34 to provide a sealed environment 44 within the cover 42 and the tube 30. Electrical terminals 46 are attached to the circuit board 38 and pass through the flange 34 to a connector 48 extending radially outwardly for external connection. The flange 34 has a fill opening 49 for the introduction of pressurized inert fill gas into the sealed space 44 of the ignitor 10, after which the fill opening 49 is sealed closed.

Figure 3:
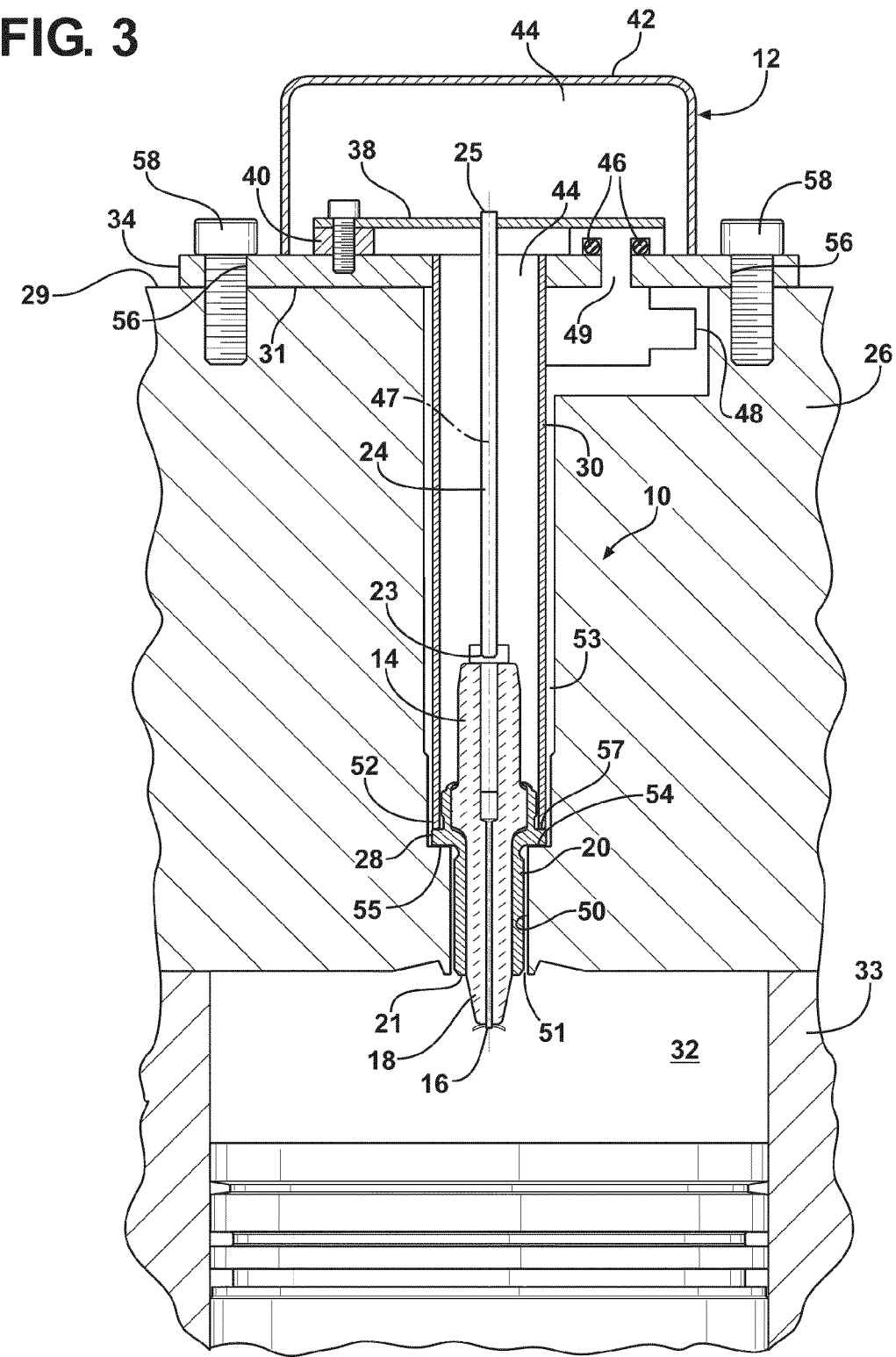
FIG. 3 is a cross-sectional view of the ignitor assembled within an internal combustion engine.

The firing end 12 of the ignitor 10 extends into the combustion chamber 32, and the metal shell 20 extends through an ignitor opening 50 in the cylinder head 26 along a central axis 47 in a slight clearance fit to provide a small annular gap 51 between the shell 20 and the opening 50. The metal shell 20 is free of external mounting threads for mounting to the cylinder head 26, as is the ignitor opening 50 free from female threads, as shown in the embodiment of FIG. 3. As such, the annular gap 51 extends directly from the flange 28 to the lower end 21. Accordingly, the only engagement between the shell 20 and the cylinder head 26 occurs along a lower planar or substantially planar sealing surface 55 of the flange 28 and the shoulder 54 of the ignitor opening 50 upon the lower end 52 of the tube 30 compressing against an upper surface 57 of the flange 28, though it should be recognized that an intervening sealing gasket can be disposed between the sealing surface 55 and the shoulder 54. This allows the insulator 14, including the nose end 18 extending into the combustion chamber 32, to be increased in diameter and/or the opening 50 to be decreased in diameter. In lieu of the mounting threads, the mount flange 34 is attached to the cylinder head 26, thereby bringing the mounting surface 31 into abutment with the upper surface 29 of the cylinder head 26 and bringing a lower end 52 of the tube 30 into direct compressive abutment with the upper surface 57 of the annular flange 28 of the shell 20 and the lower sealing surface 55 of the flange 28 into direct compressive abutment with a shoulder 54, thereby compressing the annular flange 28 of the shell 20 into sealed abutment with the annular shoulder 54 in the opening 50 of the cylinder head 26, or to otherwise operably apply a compressive sealing force between the lower sealing surface 55 and the shoulder 54 if a gasket is employed between the sealing surface 55 and the shoulder 54. Accordingly, the tube 30 extends through the opening 50 in a clearance fit to provide an annular gap 53 about the tube 30, wherein the tube 30 is of sufficient length to apply a purely axially compressive force directed along the central axis 49 of the ignitor opening 50 to compress the lower end 52 of the tube 30 against the shell flange 28 during assembly. To facilitate fastening the mount flange 34 to the cylinder head 26 to impart the purely axially directed force to the shell 20, one or more mounting holes 56 are provided in the mount flange 34 through which fasteners 58 are received for mounting the ignitor 10 to the cylinder head 26 independently of the unthreaded firing end 12. Upon tightening the fasteners 58 to a predetermined torque, a purely axially directed force within a predetermined force tolerance limit is applied to the shell 20, thus fixing the ignitor 10 within the ignitor opening 50.

Figure 4:
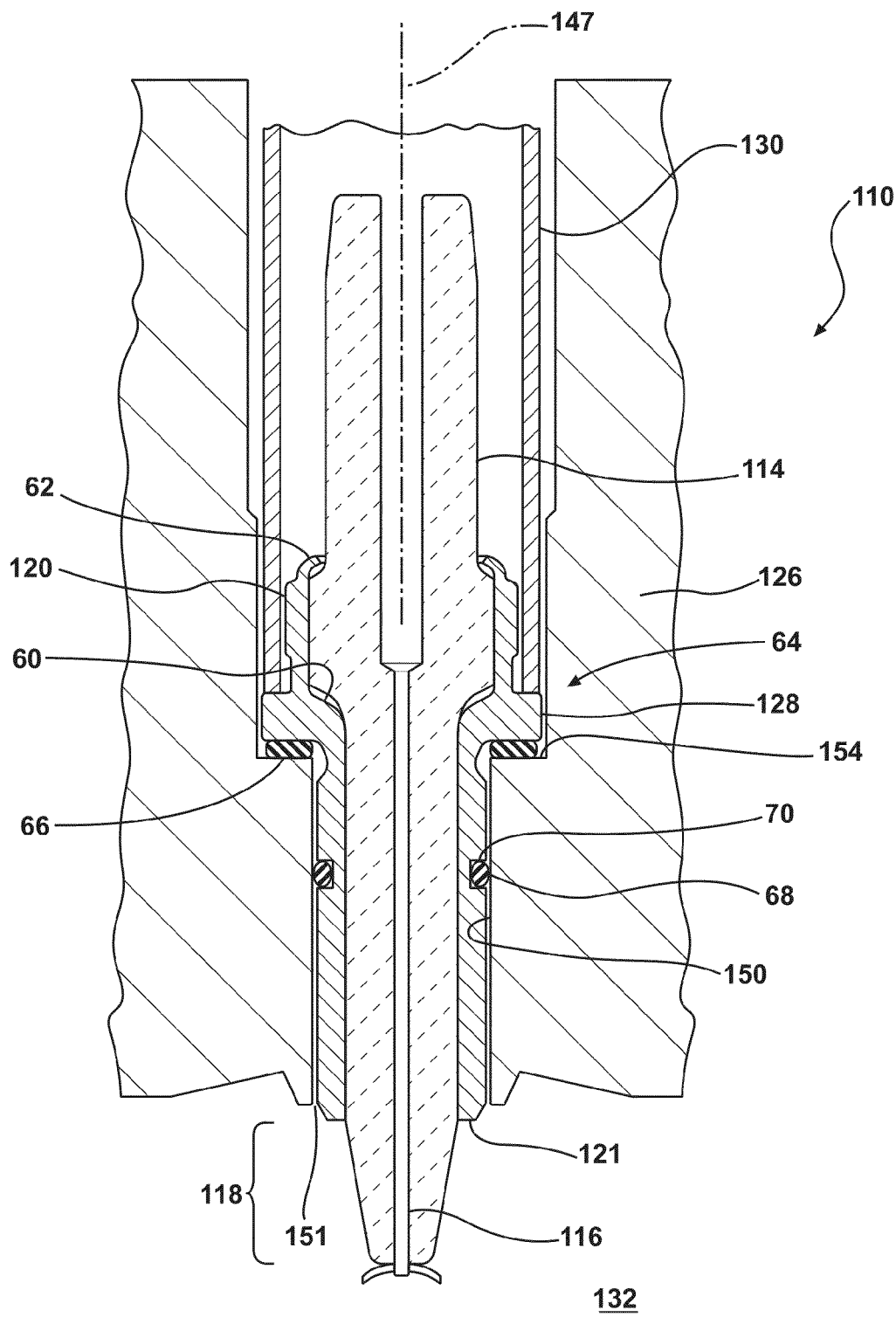
FIG. 4 is a partial cross-sectional view of an ignitor constructed in accordance with another aspect of the invention.

A portion of an ignitor 110 constructed in accordance with another aspect of the invention is shown in FIG. 4, wherein the same reference numerals, offset by a factor of 100, are used to indicate like features. The ignitor 110 is similar to the previously discussed ignitor 10 in that a tube 130 applies a purely axially directed force along a central axis 149 against an outer metal shell 120 of the ignitor 110 to fix and maintain the ignitor 110 within an ignitor opening 150 in a cylinder head 126. The ignitor 110 has an insulator 114 that is housed and captured in fixed relation within the shell 120, wherein the shell 120 captures the insulator 114 between a radially extending shoulder 60 and a turned over lip 62. The insulator 114 is heated by combustion gasses within a combustion chamber 132 on a core nose end 118. Heat passes from the insulator 114 across a small annular gap 151 and into the cylinder head 126. Due to the thermal barrier caused by the small air gap 151, and with the gap 151 extending between a flange 128 of the shell 120 to a lower end 121 of the shell 120, a significant proportion of the heat flows through the insulator 114, the shell 120 and a central electrode 116 within the insulator 114 into the cylinder head 126 at a seating/sealing area 64. The seating/sealing area 64 is formed via a square or substantially square shoulder 154 in the cylinder head 126 and a flange 128 of the shell 120. In addition, a gasket seal 66 is disposed and compressed between the flange 128 and the shoulder 154. In addition, to further provide a gas-tight seal between the insulator 114 and the cylinder head 126, and to inhibit combustion gases from directly flowing the sealing area 64, an annular sealing element 68 is received in an annular groove 70 in the shell 120, wherein the sealing element 68 is compressed between the shell 120 and the cylinder head 126 between the flange 128 and a distal or lower end 121 of the shell 120. Otherwise, the ignitor 110 is the same as described above with regard to the ignitor 10.

Figure 5:
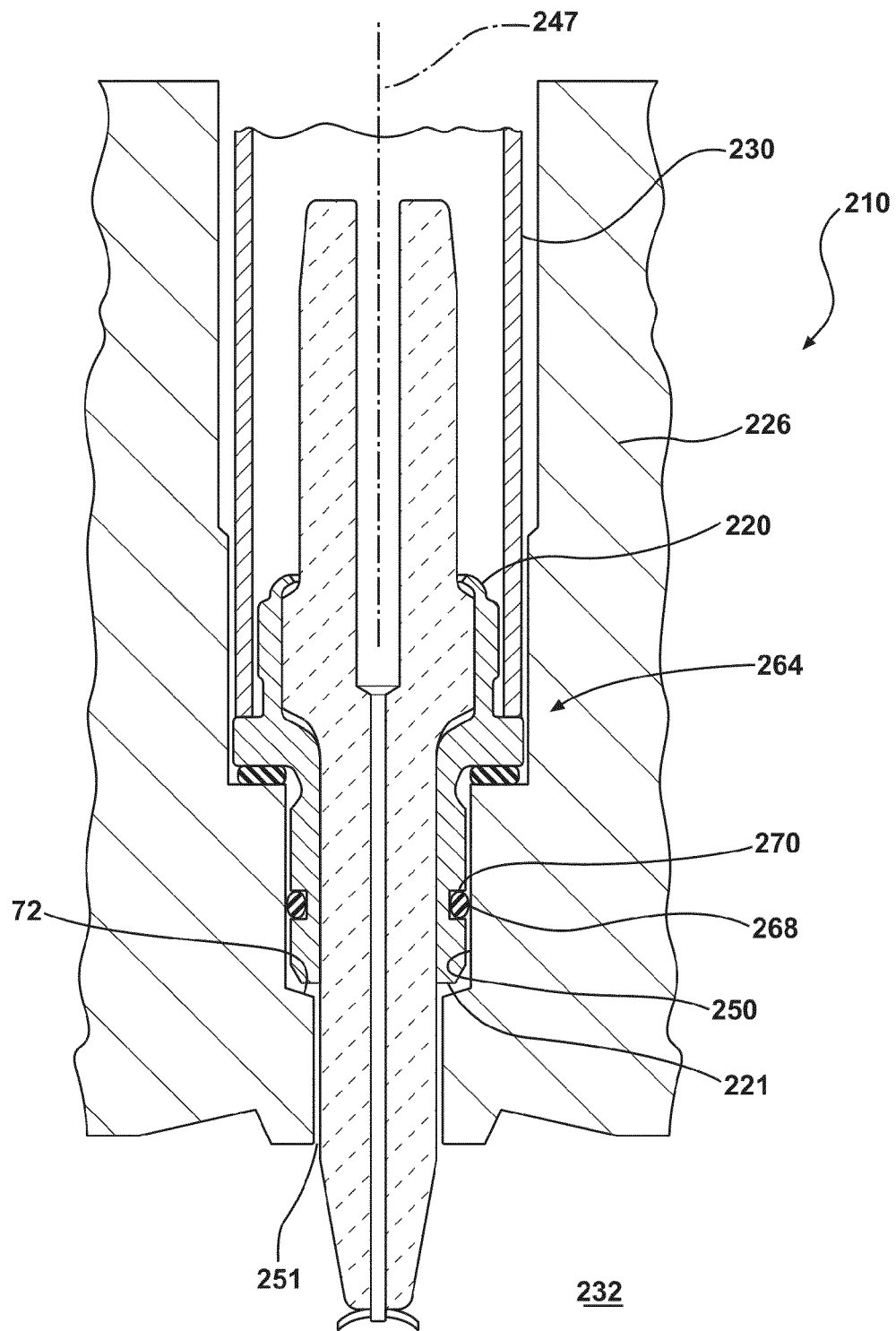
FIG. 5 is a partial cross-sectional view of an ignitor constructed in accordance with another aspect of the invention.

A portion of an ignitor 210 constructed in accordance with another aspect of the invention is shown in FIG. 5, wherein the same reference numerals, offset by a factor of 200, are used to indicate like features. The ignitor 210 is similar the previously discussed ignitors 10, 110, wherein a tube 230 applies a purely axially directed force along a central axis 249 against an outer metal shell 220 of the ignitor 210 to fix and maintain the ignitor 210 within an ignitor opening 250 in a cylinder head 226. However, rather that the shell 220 extending completely through the ignitor opening 250 to a combustion chamber 232, the shell 220 extends to a lower end 221 adjacent an annular stepped lower shoulder 72 in the ignitor opening 250. As such, an annular gap 251 is formed about a lower portion of the insulator 214 adjacent the combustion chamber 232, wherein the gap 251 steps radially outwardly at the lower shoulder 72 and extends along the shell 220 to a sealing area 264. As in the previous embodiment, an annular sealing element 268 is received in an annular groove 270 in the shell 220, wherein the sealing element 268 is compressed between the shell 220 and the cylinder head 226 between the flange 228 and a distal or lower end 221 of the shell 220. As such, the heat from the combustion gases is not directly transferred to the shell 220. Otherwise, the ignitor 210 is the same as described above with regard to the ignitor 110.

Figure 6:
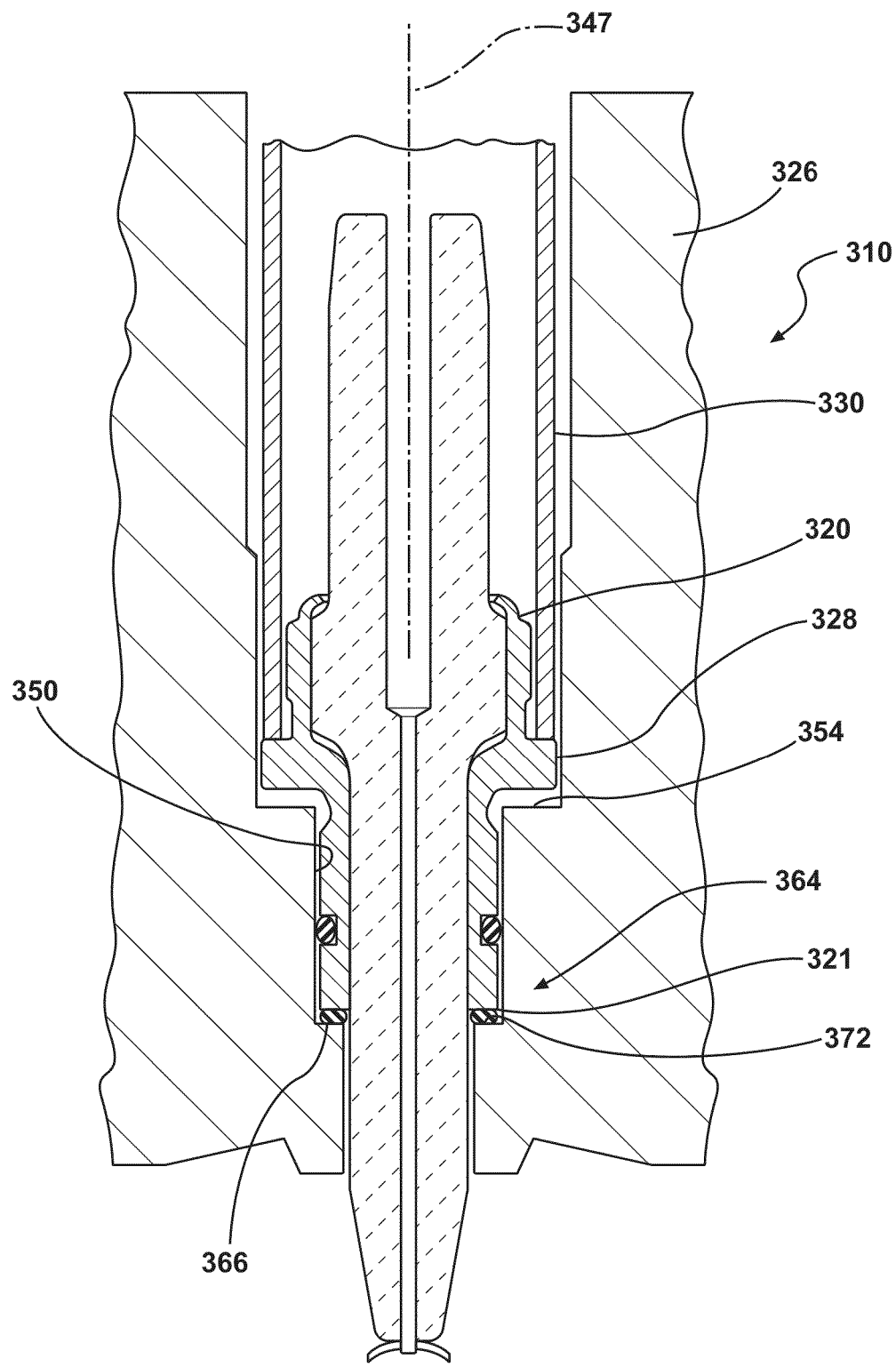
FIG. 6 is a partial cross-sectional view of an ignitor constructed in accordance with another aspect of the invention.

A portion of an ignitor 310 constructed in accordance with another aspect of the invention is shown in FIG. 6, wherein the same reference numerals, offset by a factor of 300, are used to indicate like features. The ignitor 310 is similar to the previously discussed ignitors 10, 110, 210 in that a tube 330 applies a purely axially directed force along a central axis 349 against an outer metal shell 320 of the ignitor 310 to fix and maintain the ignitor 310 within an ignitor opening 350 in a cylinder head 326. One notable difference with the ignitor 310 in comparison to the previously discussed ignitor 210 is that a seating/sealing area 364 is formed between an annular stepped lower shoulder 372 in the ignitor opening 350 and a lower end 321 of the shell 320, rather than between an upper flange 328 of the shell 320 and an upper shoulder 354 in the cylinder head 326. Accordingly the tube 330 bears and compresses against the flange 328 to bring the lower end 321 of the shell 320 into compressed and sealed engagement with a gasket 366 between the lower end 321 and the lower shoulder 372, wherein the flange 328 remains spaced from the upper shoulder 354. As such, the shell 320 is not exposed to the combustion gasses, as the gasket 366 inhibits heat from being transferred to the shell 320. Otherwise, the ignitor 310 is the same as described above with regard to the ignitor 210.

Figure 7:
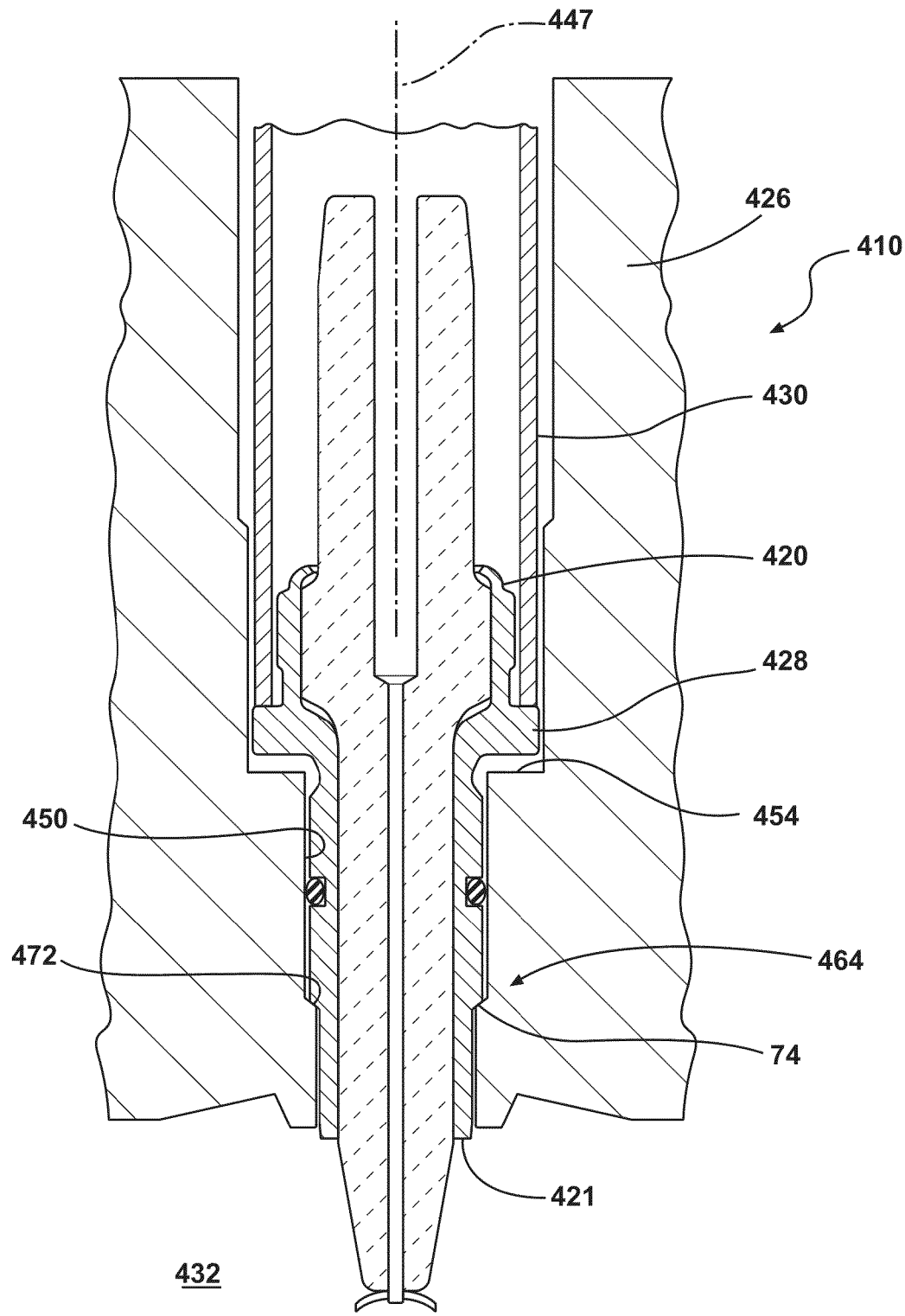
FIG. 7 is a partial cross-sectional view of an ignitor constructed in accordance with another aspect of the invention.

A portion of an ignitor 410 constructed in accordance with another aspect of the invention is shown in FIG. 7, wherein the same reference numerals, offset by a factor of 400, are used to indicate like features. The ignitor 410 is similar to the previously discussed ignitors 10, 110, 210, 310 in that a tube 430 applies a purely axially directed force along a central axis 449 against an outer metal shell 420 of the ignitor 410 to fix and maintain the ignitor 410 within an ignitor opening 450 in a cylinder head 426. One notable difference with the ignitor 410 in comparison to the previously discussed ignitor 310 is that a seating/sealing area 464 is formed between an annular tapered or conical lower shoulder 472 in the ignitor opening 450 and a lower tapered shoulder 74 of the shell 420, wherein the shell 420 continues beyond the tapered shoulder 74 in a reduced diameter to a lower end 421 adjacent a combustion chamber 432. Accordingly the tube 430 bears and compresses against an upper flange 428 of the shell 420 to bring the lower tapered end 421 of the shell 420 into compressed and seated engagement with the lower shoulder 472 of the cylinder head 426, wherein the flange 428 remains spaced from an upper shoulder 454 of the cylinder head 426.

Figure 8:
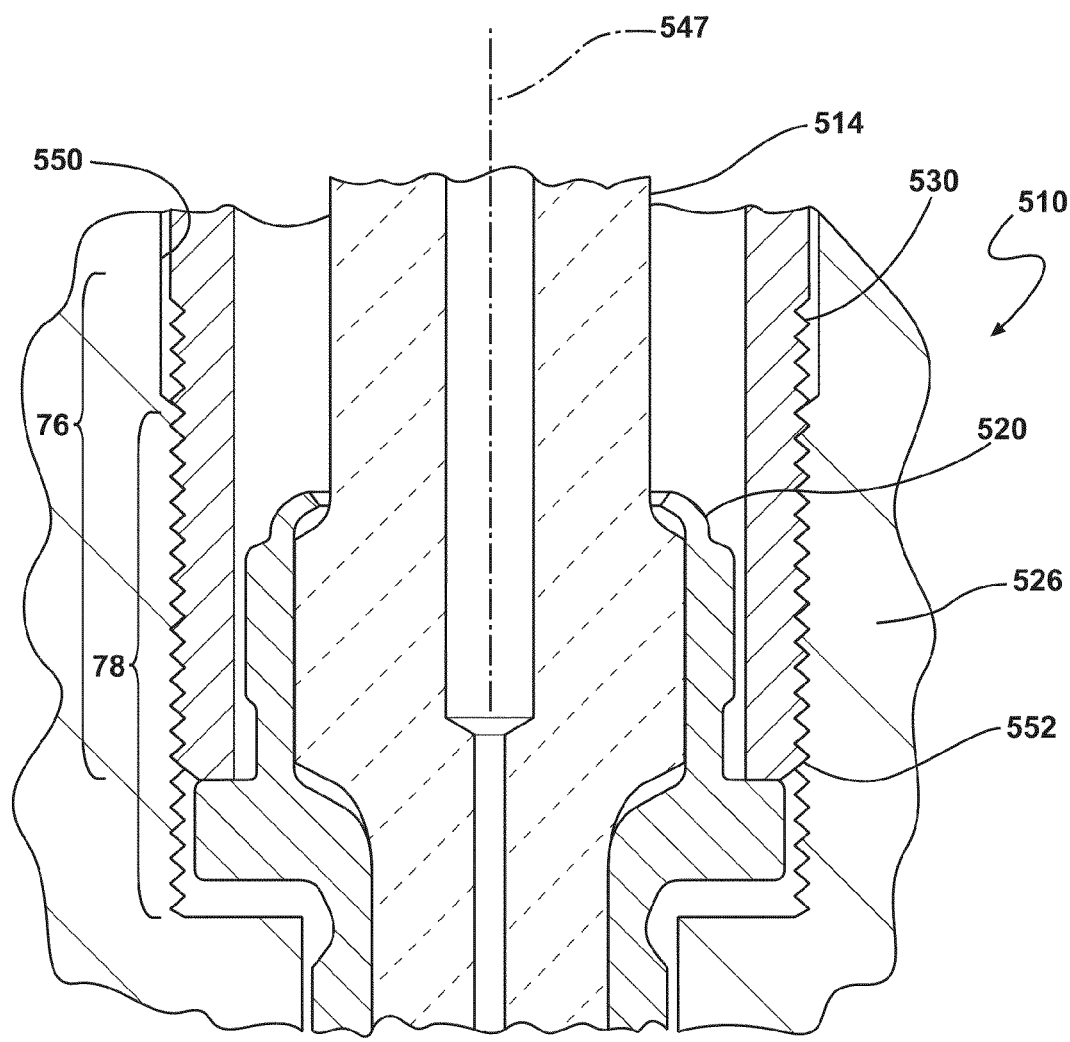
FIG. 8 partial cross-section view showing an alternate mechanism for attachment of an ignitor constructed in accordance with the invention within an internal combustion engine.

A portion of an ignitor 510 constructed in accordance with another aspect of the invention is shown in FIG. 8, wherein the same reference numerals, offset by a factor of 500, are used to indicate like features. The ignitor 510 is similar to the previously discussed ignitors 10, 110, 210, 310, 410 in that a tube 530 applies a purely axially directed force along a central axis 549 against an outer metal shell 520 of the ignitor 510 to fix and maintain the ignitor 510 within an ignitor opening 550 in a cylinder head 526. However, one notable difference with the ignitor 510 in comparison to the previously discussed ignitors 10, 110, 210, 310, 410 is the manner in which the tube 530 applies the purely axially directed force to the shell 520. The tube 530 has lower end 552 with a threaded region on its outer wall 76 configured for threaded engagement with a female threaded region 78 in an ignitor opening 550. The threaded outer wall 76 is adjacent the lower end 552 and of sufficient length to bring the shell 520 into compressed and fixed abutment within the cylinder head 526 (abutting region not shown, as it occurs in a lower portion of the shell 520 in this embodiment, such as shown in FIGS. 6 and 7, however, the abutting region could be as shown in embodiments of FIGS. 3-5). As such, upon disposing the shell 520 with insulator 514 housed therein in the cylinder head ignitor opening 550, the tube 530 is threaded into engagement with the shell 520. As such, axial and radial forces are generated within the engaged threads, however, the force applied to the shell 520 is purely axial. It should be understood that this tube mechanism can be employed with any of the previously discussed embodiments. Otherwise, the ignitor 510 functions generally the same as discussed above.

Obviously, many modifications and variations of the present invention are possible in light of the above teachings. It is, therefore, to be understood that within the scope of the appended claims, the invention may be practiced otherwise than as specifically described.

What is claimed is:

1. An internal combustion engine ignitor configured for attachment in
    an opening of a cylinder head, comprising:
        an insulator extending between a nose end and a terminal end;
        an electrode received in said insulator and extending outwardly from said nose end;
        a terminal received in said insulator and extending outwardly from said terminal end, said terminal being configured in electrical communication with said electrode;
        a metal shell surrounding at least a portion of said insulator and being free of external threads for attachment to the cylinder block;
        a tube having a lower end receiving said terminal end of said insulator therein, said tube extending to an upper end opposite said lower end, said lower end of said tube being configured to compress said shell into fixed position within the opening of the cylinder head; and
        a mount flange attached to said upper end of said tube, said mount flange compressing said lower end of said tube into abutment with said shell.

2. The internal combustion engine ignitor of claim 1 wherein said shell has a radially outwardly extending flange and said lower end of said tube is configured to apply a compressive force against said flange.

3. The internal combustion engine ignitor of claim 2 wherein said mount flange has a substantially planar mounting surface configured for attachment to an upper surface of the cylinder head.

4. The internal combustion engine ignitor of claim 3 further comprising a connector wire having a lower end attached to said terminal and extending through said tube to an upper end configured for electrical communication with a power source.

5. The internal combustion engine ignitor of claim 4 further comprising a circuit board attached to said mount flange, said circuit board being configured in electrical communication with said upper end of said connector wire.

6. The internal combustion engine ignitor of claim 3 further comprising a cover attached to said mount flange, said cover providing a sealed environment within said cover and within said tube.

7. An internal combustion engine including a cylinder head with an ignitor opening extending from an upper surface to a combustion chamber and having a radially extending upper shoulder between said upper surface and said combustion chamber, and an ignitor, said ignitor comprising:
   an insulator extending between a nose end and a terminal end;
   an electrode received in said insulator and extending outwardly from said nose end;
   a terminal received in said insulator and extending outwardly from said terminal end, said terminal being configured in electrical communication with said electrode;
   a metal shell surrounding at least a portion of said insulator and being free of external threads for attachment in said ignitor opening;
   a tube having a lower end receiving said terminal end of said insulator therein and extending to an upper end opposite said lower end; and
   a mount flange attached to said upper surface of the cylinder head and being attached to said upper end of said tube, said mount flange compressing said lower end of said tube into abutment with said shell and fixing said shell and said insulator within said ignitor opening of the cylinder head.

8. The internal combustion engine of claim 7 wherein said shell has a radially outwardly extending flange and said lower end of said tube applies a compressive force against said flange to compress said flange in fixed relation between said lower end and said upper shoulder.

9. The internal combustion engine of claim 8 wherein said shell extends between said upper shoulder and said combustion chamber.

10. The internal combustion engine of claim 9 wherein said shell extends to a lower end with an annular gap formed about said shell between said upper shoulder of said cylinder head and said lower end of said shell.

11. The internal combustion engine of claim 10 wherein said shell extends adjacent said combustion chamber.

12. The internal combustion engine of claim 11 wherein said shell has an annular groove between said lower end and said flange with a seal being received in said annular groove in sealed engagement with said cylinder head.

13. The internal combustion engine of claim 8 wherein said flange is spaced from said shoulder.

14. The internal combustion engine of claim 13 wherein said ignitor opening has a radially extending lower shoulder between said upper shoulder and said combustion chamber.

15. The internal combustion engine of claim 14 wherein said shell extends to a lower end adjacent said radially extending lower shoulder.

16. The internal combustion engine of claim 15 wherein said flange is spaced from said upper shoulder and said lower end of said shell is compressed in fixed relation with said radially extending lower shoulder.

17. The internal combustion engine of claim 15 wherein said insulator extends beyond said lower end with an annular gap being formed between said insulator and said cylinder head.

18. The internal combustion engine of claim 17 further comprising a gasket compressed axially between said lower end of said shell and said radially extending lower shoulder.

19. The internal combustion engine of claim 18 wherein said shell has an annular groove between said lower end and said flange with a seal being received in said annular groove in sealed engagement with said cylinder head.

20. The internal combustion engine of claim 14 wherein said shell extends to a lower end and has a radially extending shoulder between said flange and said lower end, said shoulder of said shell being compressed into fixed relation with said radially extending lower shoulder.

21. The internal combustion engine of claim 7 further comprising a connector wire having a lower end attached to said terminal and extending through said tube to an upper end configured for electrical communication with a power source.

22. The internal combustion engine of claim 21 further comprising a circuit board attached to said mount flange, said circuit board being configured in electrical communication with said upper end of said connector wire.

23. The internal combustion engine of claim 7 further comprising a cover attached to said mount flange, said cover providing a sealed environment within said cover and within said tube.

24. The internal combustion engine of claim 7 wherein said tube has a threaded region adjacent said lower end configured for threaded attached with a threaded region is said ignitor opening.

25. A method of assembling an ignitor within an ignitor opening in a cylinder head, comprising:
   providing the ignitor with an insulator surrounded at least in part by a shell;
   disposing the ignitor in the ignitor opening;
   disposing a tube around a terminal end of the insulator;
   disposing a mount flange on the cylinder head;
   using the mount flange to compress a lower end of the tube into abutment with the shell.

26. The internal combustion engine ignitor of claim 1 wherein said ignitor is free of external threads for attachment to said cylinder head.

27. The internal combustion engine ignitor of claim 1 wherein said mount flange and said tube and said shell provide the sole means for maintaining said ignitor in said cylinder head.

28. The internal combustion engine ignitor of claim 1 wherein said mount flange is configured to compress said lower end of said tube axially into abutment with said shell.

29. The internal combustion engine of claim 7 wherein said ignitor is free of external threads for attachment to said cylinder head.

30. The internal combustion engine of claim 7 wherein said mount flange and said tube and said shell are the sole means for maintaining said ignitor in said cylinder head.

31. The internal combustion engine of claim 7 including a gap extending continuously from said tube to said cylinder head and continuously from said mount flange to said lower end of said tube.

32. The internal combustion engine of claim 7 wherein a purely axial force compresses said lower end of said tube into abutment with said shell.

33. The internal combustion engine of claim 22 including electrical terminals attached to said circuit board for external connection.

34. An ignitor, comprising:
   an insulator extending between a nose end and a terminal end;
   an electrode received in said insulator and extending outwardly from said nose end;
   a terminal received in said insulator and extending outwardly from said terminal end, said terminal being configured in electrical communication with said electrode;

a metal shell surrounding at least a portion of said insulator and being free of external threads;

a tube having a lower end receiving said terminal end of said insulator therein, said tube extending to an upper end opposite said lower end; and said tube including a mount flange projecting from said upper end of said tube, said mount flange compressing said lower end of said tube into abutment with said shell.

* * * * *